(12) United States Patent
Wang (10) Patent No.: US 9,454,568 B2
(45) Date of Patent: Sep. 27, 2016

(54) METHOD, APPARATUS AND COMPUTER STORAGE MEDIUM FOR ACQUIRING HOT CONTENT

(71) Applicant: TENCENT TECHNOLOGY (SHENZHEN) COMPANY LIMITED, Shenzhen, Guangdong (CN)

(72) Inventor: Jiaqiang Wang, Shenzhen (CN)

(73) Assignee: TENCENT TECHNOLOGY (SHENZHEN) COMPANY LIMITED, Shenzhen, Guangdon (CN)

( * ) Notice: Subject to any disclaimer, the term of this patent is extended or adjusted under 35 U.S.C. 154(b) by 244 days.

(21) Appl. No.: 14/290,211

(22) Filed: May 29, 2014

(65) Prior Publication Data

US 2014/0280099 A1    Sep. 18, 2014

Related U.S. Application Data

(63) Continuation of application No. PCT/CN2013/088318, filed on Dec. 2, 2013.

(30) Foreign Application Priority Data

Jan. 23, 2013  (CN) .................. 2013 1 00248568

(51) Int. Cl.
  *G06F 17/00* (2006.01)
  *G06F 17/30* (2006.01)
(52) U.S. Cl.
  CPC ... *G06F 17/30424* (2013.01); *G06F 17/30997* (2013.01)
(58) Field of Classification Search
  CPC .................. G06F 17/30867; G06F 17/30864; G06F 17/30241; G06F 17/3053; G06F 17/30017
  See application file for complete search history.

(56) References Cited

U.S. PATENT DOCUMENTS 8,868,535 B1 * 10/2014 Paiz .................. G06F 17/30864
707/706

FOREIGN PATENT DOCUMENTS

| CN | 101458718 A | 6/2009 |
| CN | 102622443 A | 8/2012 |

(Continued)

OTHER PUBLICATIONS

International Search Report in international application No. PCT/CN2013/088318, mailed on Mar. 13, 2014.

(Continued)

*Primary Examiner* — Truong Vo (74) *Attorney, Agent, or Firm* — Oppedahl Patent Law Firm LLC (57) ABSTRACT

A method and apparatus for acquiring hot content are disclosed. The method includes: acquiring N search requests and N search responses corresponding to the N search requests; analyzing the N search requests and the N search responses to obtain N initial hot content datum; calculating a weight of each initial hot content data and selecting M middle hot content datum from the N initial hot content datum according to the weight of each initial hot content data, and M is a natural number and no greater than N; performing repetition elimination on the M middle hot content datum; and selecting hot content from the M middle hot content datum after the repetition elimination. The apparatus includes acquiring module, analyzing module, selecting module, repetition eliminating module and processing module. According to the disclosure, the hot content can be acquired automatically without extra editing, thereby improving the efficiency of acquiring hot content and saving the human cost.

17 Claims, 6 Drawing Sheets

(56) References Cited

FOREIGN PATENT DOCUMENTS

| CN | 102737029 A | 10/2012 |
| KR | 20070007001 A | 1/2007 |

OTHER PUBLICATIONS

English Translation of the Written Opinion of the International Search Authority in international application No. PCT/CN2013/088318, mailed on Mar. 13, 2014.

* cited by examiner

METHOD, APPARATUS AND COMPUTER STORAGE MEDIUM FOR ACQUIRING HOT CONTENT

CROSS REFERENCE TO RELATED APPLICATIONS

This application is a continuation application of PCT Patent Application No. PCT/CN2013/088318, entitled "METHOD, APPARATUS AND COMPUTER STORAGE MEDIUM FOR ACQUIRING HOT CONTENT", filed on Dec. 2, 2013, which claims priority to Chinese Patent Application No. 201310024856.8, entitled "Method and apparatus for acquiring hot content" filed on Jan. 23, 2013, both of which are incorporated by reference herein in their entirety.

TECHNICAL FIELD

The disclosure relates to the field of communication technology, and in particular to a method, apparatus and computer storage medium for acquiring hot content.

BACKGROUND

With the development of the communication technology, network gradually becomes a platform for acquiring various kinds of information. The network can be used for inquiring information, browsing news, chatting, etc. Now, hot content related to various hot words and hot events has become content more attractive to users. Therefore, how to acquire the hot content for the user to consult has become the focus of research.

In the prior art, the method for acquiring hot content includes: acquiring document data published in a social network by users; mining the document data by means of space vector model and hot words cluster to obtain some individual words; and editing manually these individual words to obtain related hot content.

However, in the process of achieving the present invention, the inventors have realized that the prior art has at least the following problems:

The existing method for acquiring hot content requires editing data manually, which leads to low efficient of acquiring hot content and a waste of manpower.

SUMMARY

In order to solve the problems in the prior art, the embodiments of the disclosure provide a method, apparatus and computer storage medium for acquiring hot content.

According to an embodiment, a method for acquiring hot content is provided, which includes:

acquiring N search requests and N search responses corresponding to the N search requests; N is a natural number;

analyzing each of the N search requests and each of the N search responses corresponding to the each of the N search requests, to obtain N initial hot content datum;

the initial hot content datum include search terms, popular broadcast information and/or data trend information;

calculating a weight of each initial hot content data, and selecting M middle hot content datum from the N initial hot content datum according to the weight of each initial hot content data; M is a natural number and no greater than N;

performing repetition elimination on the M middle hot content datum; and selecting hot content from the M middle hot content datum after the repetition elimination.

According to an embodiment, an apparatus for acquiring hot content is provided, which includes:

an acquiring module configured to acquire N search requests and N search responses corresponding to the N search requests; N is a natural number;

an analyzing module configured to analyze each of the N search requests and each of the N search responses corresponding to the each of the N search requests and obtain N initial hot content datum, wherein the initial hot content datum include the search terms, the popular broadcast information and/or data trend information;

a selecting module configured to calculate a weight of each initial hot content data, and to select M middle hot content datum from the N initial hot content datum according to the weight of each initial hot content data; M is a natural number and no greater than N;

a repetition eliminating module configured to perform repetition elimination on the M middle hot content datum; and a processing module configured to select hot content from the M middle hot content datum after the repetition elimination.

According to an embodiment, a non-transitory computer readable storage medium is provided, which includes a set of instructions that, when executed, cause at least one processor to perform the steps of the above methods according to the embodiments of the disclosure.

The advantages of the technical solutions provided by the embodiments of the disclosure are as follows:

By taking the acquired N search requests and N search responses corresponding to the N search requests as the data source for acquiring hot content, and by analyzing the data source, calculating the weight of the data source and performing repetition elimination on the data source, the hot content can be automatically obtained without extra editing, thereby improving the efficiency of acquiring hot content and saving the human cost.

BRIEF DESCRIPTION OF THE DRAWINGS

In order to illustrate the technical solutions according to the embodiments of the disclosure more clearly, the drawings referred to in description of the embodiments will be described briefly. Obviously, these drawings described below are only some examples; those skilled in the art could obtain other drawings, without exercising inventive skill, according to these drawings.

DETAILED DESCRIPTION

In order to make the purpose, the technical solutions and the advantages of the disclosure clearer, the embodiments of the disclosure will be further described in detail in conjunction with the drawings:

Embodiment 1

Figure 1:
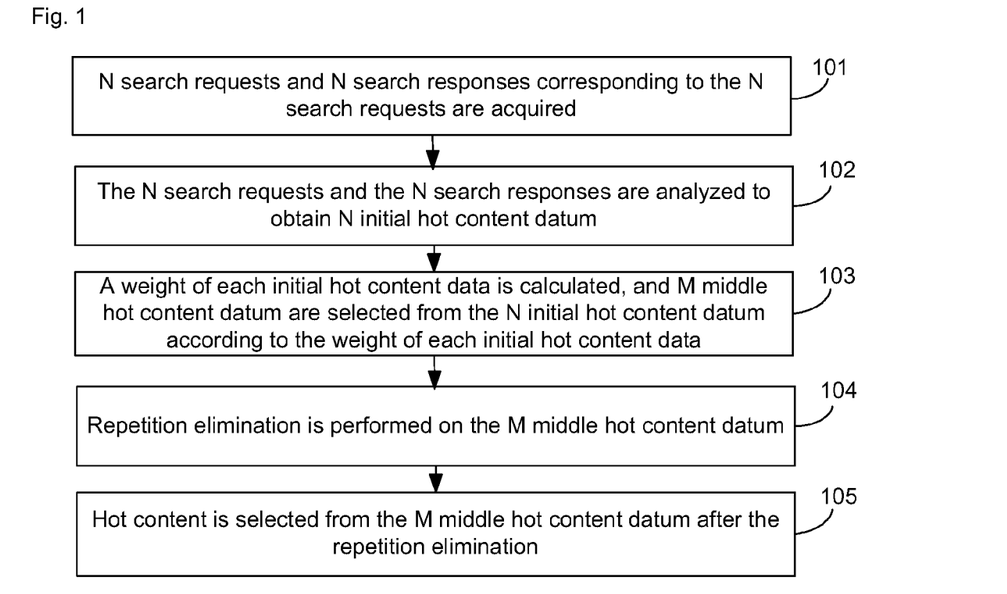
FIG. 1 illustrates a method for acquiring hot content, according to embodiment 1 of the disclosure.

A method for acquiring hot content provided by the embodiment 1 of the disclosure shown in FIG. 1 includes the following steps.

At step 101, N search requests and N search responses corresponding to the N search requests are acquired, and N is a natural number.

At step 102, each of the N search requests and each of the N search responses corresponding to the each of the N search requests are analyzed to obtain N initial hot content datum; the initial hot content datum include search terms, popular broadcast information and/or data trend information.

At step 103, a weight of each initial hot content data is calculated, and M middle hot content datum are selected from the N initial hot content datum according to the weight of each initial hot content data; M is a natural number and no greater than N.

At step 104, repetition elimination is performed on the M middle hot content datum.

At step 105, hot content is selected from the M middle hot content datum after the repetition elimination.

Preferably, after the N initial hot content datum are obtained, the method further includes the following steps:

Noise filtering is performed on the N initial hot content datum to obtain the N filtered initial hot content datum.

Correspondingly, the step of calculating the weight of each initial hot content data and selecting M middle hot content datum from the N initial hot content datum according to the weight of each initial hot content data includes:

calculating the weight of each of the N filtered initial hot content datum, and selecting M middle hot content datum from the N filtered initial hot content datum according to the weight of each of the N filtered initial hot content datum.

Preferably, after the N filtered initial hot content datum are obtained, the method further includes the following step:

The N filtered initial hot content datum are clustered, according to the popular broadcast information included in each initial hot content data, to obtain K clustered initial hot content datum, and K is a natural number and M K N.

Correspondingly, the step of calculating the weight of each initial hot content data and selecting M middle hot content datum from the N initial hot content datum according to the weight of each initial hot content data includes:

calculating the weight of each of the K clustered initial hot content datum, and selecting M middle hot content datum from the K clustered initial hot content datum according to the weight of each of the K clustered initial hot content datum.

Preferably, the step of calculating the weight of each of the K clustered initial hot content datum, and selecting M middle hot content datum from the K clustered initial hot content datum according to the weight of each of the K clustered initial hot content datum includes:

calculating the weight of each of the K clustered initial hot content datum;

selecting, according to an descending order of weight, M clustered initial hot content datum from the K clustered initial hot content datum; and taking the M clustered initial hot content datum as M middle hot content datum.

Preferably, the step of performing repetition elimination on the M middle hot content datum includes:

performing repetition elimination on the search terms included in the M middle hot content datum by means of a similarity rate repetition eliminating method and at similarity fingerprint repetition eliminating method; or performing repetition elimination on the popular broadcast information included in the M middle hot content datum by means of the similarity rate repetition eliminating method; or performing repetition elimination on the search terms and popular broadcast information in the M middle hot content datum by means of the similarity rate repetition eliminating method.

According to the method for acquiring hot content provided by the embodiment of the disclosure, by taking the acquired N search requests and N search responses corresponding to the N search requests as the data source for acquiring hot content, and by analyzing the data source, calculating the weight of the data source, and performing de-duplicating on the data source, the hot content can be acquired automatically without extra editing, thereby improving the efficiency of acquiring hot content and saving the human coast. The quality of the acquired hot content is improved by deleting inferior words through noise filtering. It is convenient for disposing of the words having identical features by clustering, which improves the efficiency of acquiring the hot content and the quality of the acquired hot content.

Embodiment 2

Figure 2:
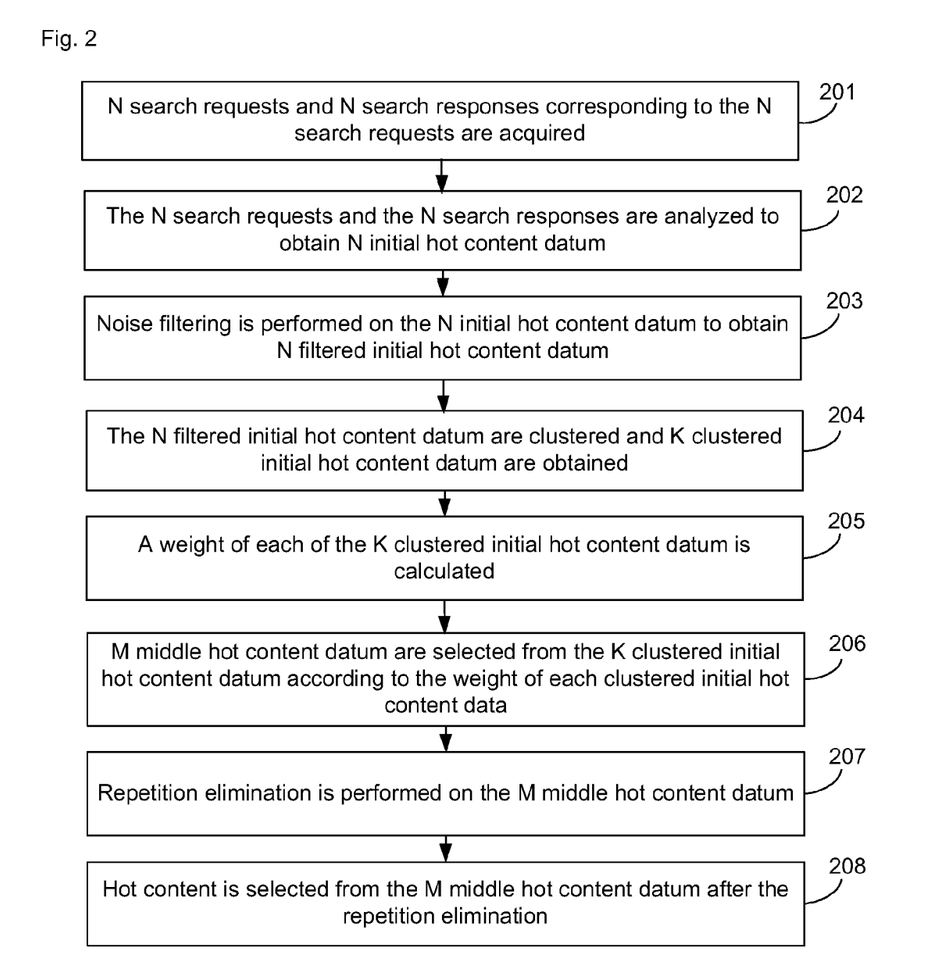
FIG. 2 illustrates a method for acquiring hot content, according to embodiment 2 of the disclosure.

A method for acquiring hot content provided by the embodiment 2 of the disclosure, shown in FIG. 2, includes the following steps:

At step 201, N search requests and N search responses corresponding to the N search requests are acquired, and N is a natural number.

The search requests are search terms input in the microblog search box and/or the wechat search box by users. The search responses are the search results obtained by searching according to the search request. The search responses obtained by searching according to each search request may include many pieces of information, or a few pieces of information.

Hot content is acquired by means of the search requests and the search responses, that is, the search requests and search responses are taken as the data source for acquiring hot content. Specifically, in the embodiments of the disclosure, the search requests input in the microblog search box A by the user and the search responses corresponding to the search requests are taken as the data source.

Specifically, the step of acquiring N search requests and N search responses corresponding to the N search requests may be a step of acquiring multiple search requests and search responses during a certain period (e.g., 10 minutes, or one hour) before subsequent steps are performed, or may be a step of acquiring a certain number of search requests and search responses (e.g., 100 search requests) before subsequent steps are performed.

At step 202, each of N search requests and each of N search responses corresponding to the each of N search requests are analyzed to obtain N initial hot content datum.

Specifically, each search request and each search response corresponding to the each search request are analyzed to obtain one initial hot content data corresponding to the each search request and the each search response.

Preferably, the initial hot content datum include search terms, popular broadcast information and/or data trend information.

Preferably, the search terms are the related words that can summarize the retrieved content.

Preferably, the popular broadcast information is the broadcast information with the most number of rebroadcast in all broadcast information included in the search response. The popular broadcast information include popular broadcast content, Twitterid of the popular broadcast, release time of the popular broadcast, current number of rebroadcast of the popular broadcast, etc.

Preferably, the data trend information is the amount of data generated during a preset period (e.g., one day or one hour) by searching according to a certain search request. The data trend information is generated during the search with a certain search request.

At step 203, noise filtering is performed on the N initial hot content datum to obtain the filtered N initial hot content datum.

Specifically, each search request and search response corresponds to one initial hot content data. Noise filtering is performed on each initial hot content data: filtering out the following parts in each initial hot content data: @somebody, a sentence with a length longer than a preset first length threshold, a sentence with a length shorter than a preset second length threshold, and a sentence with the number of punctuation included in the sentence greater than a preset number threshold; filtering out a initial hot content data that including no popular broadcast information (i.e., no popular broadcast information is returned); filtering out an the search request information with the number of search response information less than the preset number of threshold and the initial hot content datum corresponding to the search response information; calculating the hot of the data trend information included in initial hot content, and filtering out the initial hot content with the hot of the data trend information less than the preset hot threshold.

At step 204, the N filtered initial hot content datum are clustered according to the popular broadcast information included in each initial hot content data, and K clustered initial hot content datum are obtained, wherein K is a natural number and M≤K≤N.

Specifically, the initial hot content datum including same popular broadcast information are stored together, to cluster the filtered initial hot content datum. Since the popular broadcast information are obtained by retrieving the relevant search terms, storing the initial hot content datum including same popular broadcast information together is clustering the filtered initial hot content datum, and is also clustering the search terms.

At step 205, a weight of each of the K clustered initial hot content datum is calculated.

Firstly, the weights of search terms, popular broadcast information and/or data trend information included in the clustered initial hot content datum are calculated respectively.

The weight of search terms are obtained by calculating, by means of a preset weighted average formula, the result of normalizing the request change rate and the number of the retrieval of the search terms.

The request change rate of the search terms is the number of request of the search terms per hour or/and per day.

The weight of popular broadcast information are obtained by calculating, by means of a preset weighted average formula, the result of normalizing the change rate of rebroadcast number and rebroadcast number of the popular broadcast information.

The change rate of rebroadcast number of the popular broadcast information is calculated according to the generating time of the popular broadcast and the rebroadcast number of the popular broadcast information.

The weight of data trend information is obtained by calculating, by means of a preset weighted average formula, a result of normalizing the hot of data trend information.

The hot of data trend information is obtained according to the data trend information per hour or per day.

Secondly, the weight of each of the K clustered initial hot content datum is obtained by calculating, by means of a preset weighted average formula, the result of normalizing the weights of search terms, popular broadcast information and/or data trend information included in the clustered initial hot content datum.

Each weighted average formula can be set according to specific situations, to which no specific limit is set.

At step 206, M middle hot content datum are selected from the K clustered initial hot content datum, wherein M is no greater than K.

Specifically, the K clustered initial hot content datum are arranged in a descending order of weight, and first M clustered initial hot content datum are selected as M middle hot content datum.

At step 207, repetition elimination is performed on the M middle hot content datum.

In the embodiment, repetition elimination is performed on the M middle hot content datum by means of a similarity rate repetition eliminating method and a similarity fingerprint repetition eliminating method. In order to describe clearly, assuming there are two character strings A and B.

The similarity rate repetition eliminating method: classifying the words in A and B respectively, and selecting words of a preset word class (such as noun, adjective, etc.) respectively from A and B. Comparing the words of the preset word class selected from A with that selected from B to obtain the number of the same words between A and B (denoted by (A∩B)). Obtaining the similarity rate of A and B by means of the preset computational formula of the similarity rate (A∩B)/min(A, B). Comparing the similarity rate of A and B with a preset similarity rate threshold, A is similar to B if the similarity rate of A and B is greater than the preset similarity rate threshold, otherwise, A is not similar to B, wherein min(A, B) is to obtain the shorter length between the string lengths of A and B.

The similarity fingerprint repetition eliminating method: classifying the words in A and B, and selecting words of a preset word class (such as noun, adjective, etc.) respectively as characteristics, calculating the similarity fingerprint value by means of similarity fingerprint algorithm. Comparing the similarity fingerprint value with a preset similarity fingerprint threshold, A is similar to B if the similarity fingerprint value is greater than the preset similarity fingerprint threshold, otherwise, A is not similar to B.

Specifically, repetition elimination is performed on the search terms included in the M middle hot content datum by means of the similarity rate repetition eliminating method and the similarity fingerprint repetition eliminating method.

It should be noted that either the similarity rate repetition eliminating method or the similarity fingerprint repetition eliminating method ascertains that the search terms included in one middle hot content data repeat the search terms included in another middle hot content data, then they repeat certainly.

The specific process is as follows: performing repetition elimination with each search term included in the first middle hot content data (equivalent to A) on each search term included in the rest M−1 middle hot content datum (equivalent to B) respectively; performing repetition elimination with each search term included in the second middle hot content data (equivalent to A) on each search term included in the rest M−1 middle hot content datum (equivalent to B) respectively; . . . ; performing repetition elimination with each search term included in the $M^{th}$ middle hot content data (equivalent to A) on each search term included in the rest M−1 middle hot content datum (equivalent to B) respectively. That is, the repetition elimination can be performed on the search words by means of the first and second methods.

Specifically, repetition elimination is performed on the popular broadcast information included in the M middle hot content datum by means of the similarity rate repetition eliminating method.

The specific process is as follows: performing repetition elimination with each popular broadcast information included in the first middle hot content data (equivalent to A) on each popular broadcast information included in the rest M−1 middle hot content datum (equivalent to B) respectively; performing repetition elimination with each popular broadcast information included in the second middle hot content data (equivalent to A) on each popular broadcast information included in the rest M−1 middle hot content datum (equivalent to B) respectively; . . . ; performing repetition elimination with each popular broadcast information included in the $M^{th}$ middle hot content data (equivalent to A) on each popular broadcast information included in the rest M−1 middle hot content datum (equivalent to B) respectively. That is, repetition elimination can be performed on the popular broadcast information by means of the first method.

Specifically, repetition elimination is performed on the search terms and the popular broadcast information included in the M middle hot content datum by means of the similarity rate repetition eliminating method.

The specific process is as follows: performing repetition elimination with each search term included in the first middle hot content data (equivalent to A) on each search term (equivalent to B) or each popular broadcast information (equivalent to B) included in the rest M−1 middle hot content datum respectively; performing repetition elimination with each search term included in the second middle hot content data (equivalent to A) on each search term (equivalent to B) or each popular broadcast information (equivalent to B) included in the rest M−1 middle hot content datum respectively; . . . ; performing repetition elimination with each search term included in the $M^{th}$ middle hot content data (equivalent to A) on each search term (equivalent to B) or each popular broadcast information (equivalent to B) included in the rest M−1 middle hot content datum respectively. By means of the similarity rate repetition eliminating method, performing repetition elimination with each popular broadcast information included in the first middle hot content data (equivalent to A) on each search term (equivalent to B) or each popular broadcast information (equivalent to B) included in the rest M−1 middle hot content datum respectively; performing repetition elimination with each popular broadcast information included in the second middle hot content data (equivalent to A) on each search term (equivalent to B) or each popular broadcast information (equivalent to B) included in the rest M−1 middle hot content datum respectively; . . . ; performing repetition elimination with each popular broadcast information included in the $M^{th}$ middle hot content data (equivalent to A) on each search term (equivalent to B) or each popular broadcast information (equivalent to B) included in the rest M−1 middle hot content datum respectively. That is, repetition elimination is performed on the search terms and the popular broadcast information alternately by means of the first method.

At step 208, hot content is selected from the M middle hot content datum after the repetition elimination.

The hot content includes keywords and texts of the hot content.

The keywords of the hot content can be obtained as below: for all the search terms corresponding to the popular broadcast information having the same content, computing the weighted average of the length and the search times of each search term to obtain the weighted average of each search term, and selecting the search term with the largest weighted average as the search term of the hot content.

Selecting the popular broadcast information included in the middle hot content datum as the text of the hot content.

According to the method for acquiring hot contents provided by the embodiment of the disclosure, by taking the N search requests and the N search responses corresponding to the N search requests as the data sources for acquiring hot content, and by analyzing the data source, calculating the weight of the data source and performing repetition elimination on the data sources, the hot content can be obtained automatically without extra editing, thereby improving the efficiency of acquiring hot content and saving the human cost. The quality of the acquired hot content is improved by deleting inferior words through noise filtering. It is convenient for disposing of the words having identical features by clustering, which improves the efficiency of acquiring the hot content and the quality of the acquired hot content.

Embodiment 3

Figure 3:
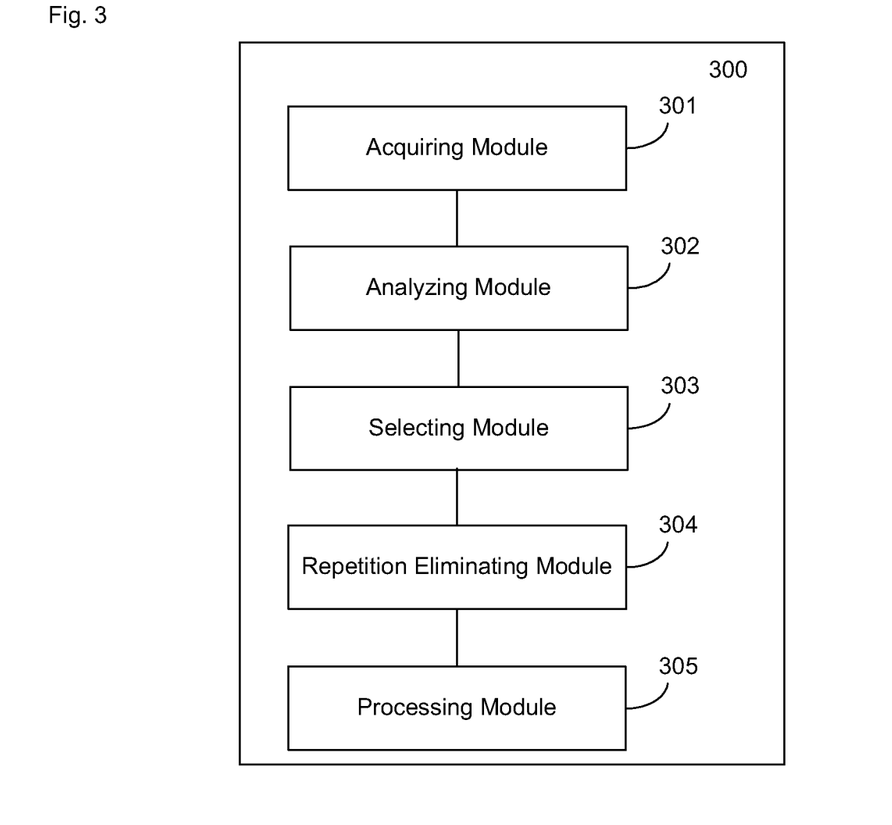
FIG. 3 illustrates a first device structure for acquiring hot content, according to embodiment 3 of the disclosure.

An apparatus for acquiring hot content provided by the embodiment 3 of the disclosure is provided, as shown in FIG. 3. Referring to FIG. 3, the apparatus 300 includes acquiring module 301, analyzing module 302, selecting module 303, repetition eliminating module 304, and processing module 305.

The acquiring module 301 is configured to acquire N search requests and N search responses corresponding to the N search requests, and N is a natural number.

The analyzing module 302 is configured to analyze each of the N search requests and each of the N search responses corresponding to the each of the N search requests to obtain N initial hot content datum; the initial hot content datum include search terms, popular broadcast information and/or data trend information.

The selecting module 303 is configured to calculate a weight of each initial hot content data, and to select M middle hot content datum from the N initial hot content datum according to the weight of each initial hot content data; M is a natural number and no greater than N.

The repetition eliminating module 304 is configured to perform repetition elimination on the M middle hot content datum.

The processing module 305 is configured to select hot content from the M middle hot content datum after the repetition elimination.

Figure 4:
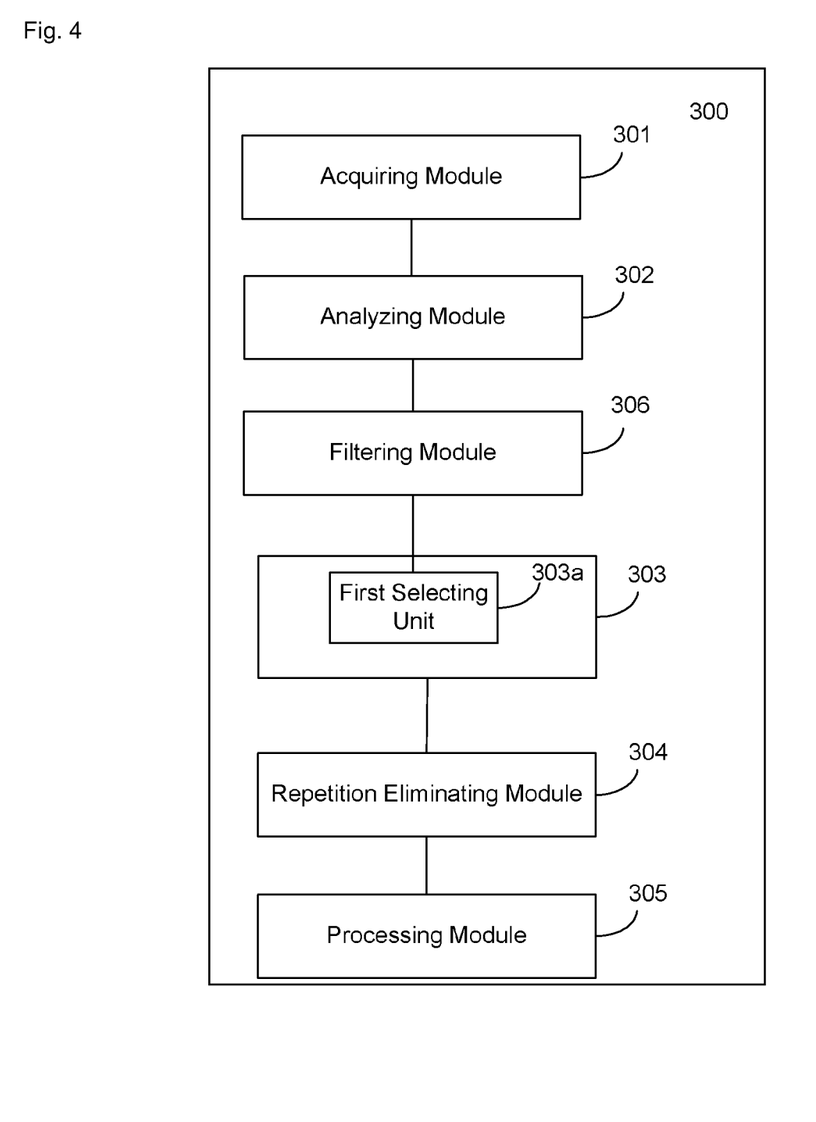
FIG. 4 illustrates a second device structure for acquiring hot content, according to embodiment 3 of the disclosure.

Preferably, as shown in FIG. 4, the apparatus 300 further includes a filtering module 306.

The filtering module 306 is configured to perform noise filtering on the N initial hot content datum to obtain N filtered initial hot content datum.

Accordingly, the selecting module 303 includes a first selecting unit 303a.

The first selecting unit 303a is configured to calculate a weight of each filtered initial hot content data and select M middle hot content datum from the N filtered initial hot content datum according to the weight of each filtered initial hot content data.

Figure 5:
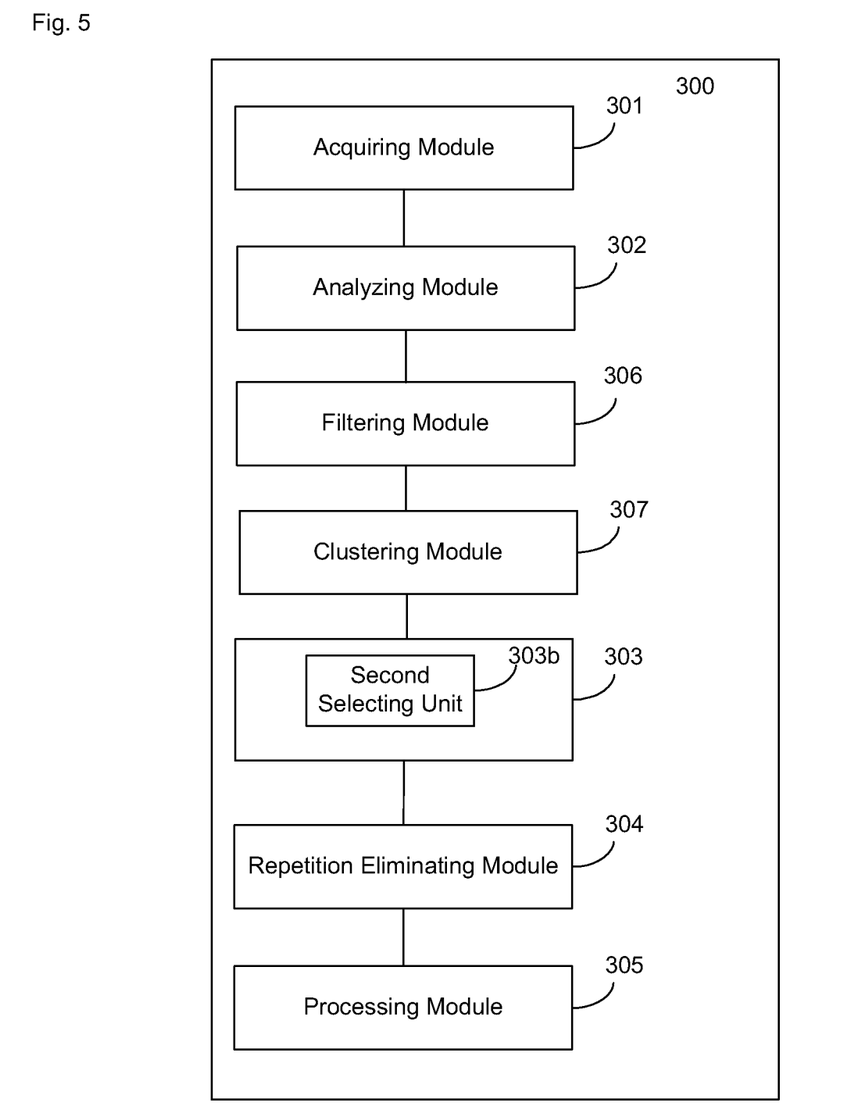
FIG. 5 illustrates a third device structure for acquiring hot content, according to embodiment 3 of the disclosure.

Preferably, as shown in FIG. 5, the apparatus 300 further includes a clustering module 307.

The clustering module 307 is configured to cluster the N filtered initial hot content datum according to the popular broadcast information included in each initial hot content data, to obtain K clustered initial hot content datum, and K is a natural number and M≤K≤N.

Accordingly, the selecting module 303 includes a second selecting unit 303b.

The second selecting unit 303b is configured to calculate a weight of each clustered initial hot content data, and to select M middle hot content datum from the K clustered initial hot content datum.

Preferably, the second selecting unit 303b includes a calculating subunit, a selecting subunit and a processing subunit.

The calculating subunit is configured to calculate a weight of each of the K clustered initial hot content datum.

The selecting subunit is configured to select M clustered initial hot content datum from the K clustered initial hot content datum according to an descending order of weight.

The processing subunit is configured to take the M clustered initial hot content datum as M middle hot content datum.

Preferably, the repetition eliminating module 304 includes a first repetition eliminating unit, a second repetition eliminating unit and a third repetition eliminating unit.

The first repetition eliminating unit is configured to perform repetition elimination on the search terms included in the M middle hot content datum by means of a preset similarity rate repetition eliminating device and a preset similarity fingerprint repetition eliminating device.

The second repetition eliminating unit is configured to perform repetition elimination on the popular broadcast information included in the M middle hot content datum by means of the preset similarity rate repetition eliminating device.

The third repetition eliminating unit is configured to perform repetition elimination on the search terms and the popular broadcast information included in the M middle hot content datum by means of the preset similarity rate repetition eliminating device.

By taking the N search requests and N search responses corresponding to the N search requests as the data sources for acquiring hot content, and by analyzing the data source, calculating the weight of the data source and performing repetition elimination on the data sources, the hot content can be obtained automatically without extra editing, thereby improving the efficiency of acquiring hot content and saving the human cost. The quality of the acquired hot content is improved by deleting inferior words through noise filtering. It is convenient for disposing of the words having identical features by clustering, which improves the efficiency of acquiring the hot content and the quality of the acquired hot content.

It should be noted that the apparatus for acquiring hot content provided by the embodiment of the disclosure is only illustrated according to the above function modules, while, in the practical application, the above functions can be achieved by different function modules according to the need, that is, the inner structure of the apparatus is divided into different function modules to achieve all or part of the functions described above. Furthermore, the apparatus for acquiring hot content provided by the above embodiment belongs to the same conception with the embodiments of the method for acquiring hot content, therefore, its specific implementation procedure can refer to the method embodiment in detail, which is not repeated here.

The numbers of the embodiments of the disclosure are only for illustration, which do not represent the advantages and disadvantages of the embodiments.

Figure 6:
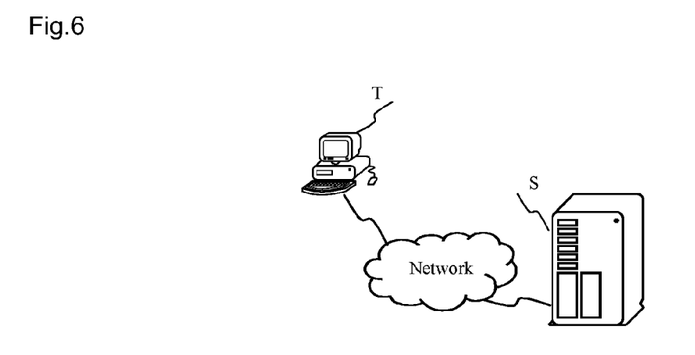
FIG. 6 illustrates a structure of implementation environment of the embodiments of the disclosure.

FIG. 6 illustrates a structure of implementation environment of the embodiments of the disclosure. As shown in FIG. 6, the implementation environment includes a user terminal T and a server S.

The user terminal T is connected with the server S via wired networks or wireless networks. The user terminal T may be an electronic device capable of accessing websites having searching function, such as a computer, a smart phone, or other electronic devices. Any user can access via the user terminal T the websites having searching function.

The server S may be a searching engine server provided by any operator, or a cluster of searching engine servers.

Figure 7:
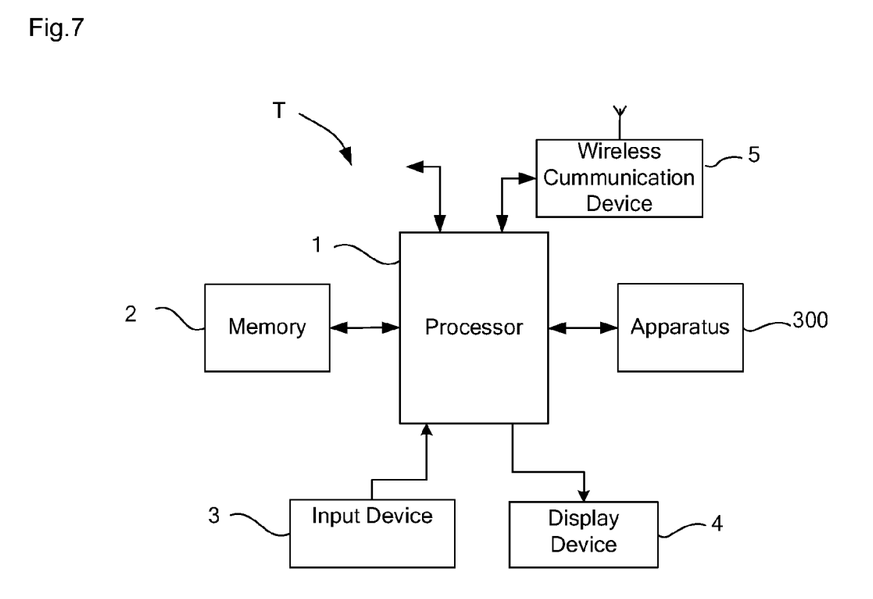
FIG. 7 illustrates a structure of a user terminal according to the embodiments of the disclosure.

FIG. 7 illustrates a structure of a user terminal according to the embodiments of the disclosure. The user terminal is configured to implement the methods for acquiring hot content according to the above embodiments.

As shown in FIG. 7, the user terminal T may include, but not limited to the following components: a processor 1 including one or more processing cores, a memory 2 including one or more non-transitory computer readable storage mediums, an input device 3, a display device 4, a wireless communication device 5, and the apparatus for acquiring hot content 300 according to the above embodiments.

Those skilled in the art should understand that the above structure of the user terminal shown in FIG. 7 does not constitute a limit to the user terminal. The user terminal can include more or less than those shown in FIG. 7, or be a combination of certain components, or be a different layout of the components.

Those skilled in the art may understand that the implementation of all or part of the steps of the embodiments above can be achieved by hardware or by instructing the relevant hardware through a computer program. The computer program may be stored on a non-transitory computer-readable storage medium. Examples of the non-transitory computer-readable medium can include, but are not limited to, hard disks, removable magnetic disks, removable optical disks (e.g., compact disks and digital video disks), magnetic cassettes, memory cards or sticks, random access memories (RAM), read only memories (ROM), etc.

According to an embodiment of the disclosure, a non-transitory computer readable storage medium is provided, which includes a set of instructions that, when executed, cause at least one processor to perform the steps of the above methods for acquiring hot content according to the embodiments of the disclosure.

The above description is only preferred embodiments and is not intended to limit the disclosure. The scope of the disclosure should be determined with reference to the appended claims, along with the full scope of equivalents to which such claims are entitled.

The invention claimed is:

1. A method for acquiring hot content, comprising:
    acquiring N search requests and N search responses corresponding to the N search requests, wherein N is a natural number;
    analyzing each of the N search request and each of the N search responses corresponding to the each of the N search requests to obtain N initial hot content datum, wherein the initial hot content datum include search terms, popular broadcast information and/or data trend information;
    calculating a weight of each initial hot content data, and select M middle hot content datum from the N initial hot content datum according to the weight of each initial hot content, wherein M is a natural number and is no more than N;
    performing repetition elimination on the M middle hot content datum; and
    selecting hot content from the M middle hot content datum after the repetition elimination.

2. The method according to claim 1, further comprising the step, preceding the step of calculating a weight of each initial hot content data, of:
    performing noise filtering on the N initial hot content datum.

3. The method according to claim 2, further comprising the step, preceding the step of calculating a weight of each initial hot content data, of:
    clustering the N filtered initial hot content datum according to the popular broadcast information included in each initial hot content data and obtaining K clustered initial hot content datum, wherein K is a natural number and M≤K≤N;
    accordingly, the step of calculating a weight of each initial hot content data and selecting M middle hot content datum from the N initial hot content datum according to the weight of each initial hot content data comprises:
    calculating a weight of each clustered initial hot content data, and selecting M middle hot content datum from the K clustered initial hot content datum according to the weight of each clustered initial hot content data.

4. The method according to claim 3, the step of calculating a weight of each clustered initial hot content data and selecting M middle hot content datum from the K clustered initial hot content datum according to the weight of each clustered initial hot content data comprising:
    calculating the weight of each of the K clustered initial hot content datum;
    selecting M clustered initial hot content datum from the K clustered initial hot content datum according to a descending order of weight; and
    taking the M clustered hot content datum as M middle hot content datum.

5. The method according to claim 4, wherein the step of performing repetition elimination on the M middle hot content datum comprises:
    performing repetition elimination on the search terms included in the M middle hot content datum by means of a preset similarity rate repetition eliminating method and a preset similarity fingerprint repetition eliminating method; or
    performing repetition elimination on the popular broadcast information included in the M middle hot content datum by means of the preset similarity rate repetition eliminating method; or
    performing repetition elimination on the search terms and the popular broadcast information included in the M middle hot content datum by means of the preset similarity rate repetition eliminating method.

6. The method according to claim 3, wherein the step of performing repetition elimination on the M middle hot content datum comprises:
    performing repetition elimination on the search terms included in the M middle hot content datum by means of a preset similarity rate repetition eliminating method and a preset similarity fingerprint repetition eliminating method; or
    performing repetition elimination on the popular broadcast information included in the M middle hot content datum by means of the preset similarity rate repetition eliminating method; or
    performing repetition elimination on the search terms and the popular broadcast information included in the M middle hot content datum by means of the preset similarity rate repetition eliminating method.

7. The method according to claim 1, wherein the step of performing repetition elimination on the M middle hot content datum comprises:
    performing repetition elimination on the search terms included in the M middle hot content datum by means of a preset similarity rate repetition eliminating method and a preset similarity fingerprint repetition eliminating method; or
    performing repetition elimination on the popular broadcast information included in the M middle hot content datum by means of the preset similarity rate repetition eliminating method; or
    performing repetition elimination on the search terms and the popular broadcast information included in the M middle hot content datum by means of the preset similarity rate repetition eliminating method.

8. An apparatus for acquiring the hot content, comprising:
    an acquiring module configured to acquire N search requests and N search responses corresponding to the N search requests, wherein N is a natural number;
    an analyzing module configured to analyze each of the N search requests and each of the N search responses corresponding to the each of the N search requests and obtain N initial hot content datum, wherein the initial hot content datum include the search terms, the popular broadcast information and/or data trend information;
    a selecting module configured to calculate a weight of each initial hot content data, and to select M middle hot content datum from the N initial hot content datum according to the weight of each initial hot content data, wherein M is a natural number and no greater than N;
    a repetition eliminating module configured to perform repetition elimination on the M middle hot content datum; and
    a processing module configured to select hot content from the M middle hot content datum after the repetition elimination.

9. The apparatus according to claim 8, further comprising:
    a filtering module configured to perform noise filtering on the N initial hot content datum;
    the selecting module comprising:
    a first selecting unit configured to calculate a weight of each filtered initial hot content data, and to select M middle hot content datum from the N filtered initial hot content datum according to the weight of each filtered initial hot content data.

10. The apparatus according to claim 9, further comprising:
  a clustering module configured to cluster the N filtered initial hot content datum according to the popular broadcast information included in each initial hot content data and obtain K clustered initial hot content datum, wherein K is a natural number and M≤K≤N;
  the selecting module comprising:
  a second selecting unit configured to calculate a weight of each clustered initial hot content data, and to select M middle hot content datum from the K clustered initial hot content datum according to the weight of the each clustered initial hot content data.

11. The apparatus according to claim 10, wherein the second selecting unit comprises:
  a calculating subunit configured to the weight of each of the K clustered initial hot content datum;
  a selecting subunit configured to select M clustered initial hot content datum from the K clustered initial hot content datum according a descending order of weight; and
  a processing subunit configured to take the M clustered initial hot content datum as M middle hot content datum.

12. The apparatus according to claim 11, wherein the repetition eliminating module comprises:
  a first repetition eliminating unit configured to perform repetition elimination on the search terms included in the M middle hot content datum by means of a preset similarity rate repetition eliminating device and a preset similarity fingerprint repetition eliminating device;
  a second repetition eliminating unit configured to perform repetition elimination on the popular broadcast information included in the M middle hot content datum by means of a preset similarity rate repetition eliminating device; and
  a third repetition eliminating unit configured to perform repetition elimination on the search terms and the popular broadcast information included in the M middle hot content datum by means of a preset similarity rate repetition eliminating device.

13. The apparatus according to claim 10, wherein the repetition eliminating module comprises:
  a first repetition eliminating unit configured to perform repetition elimination on the search terms included in the M middle hot content datum by means of a preset similarity rate repetition eliminating device and a preset similarity fingerprint repetition eliminating device;
  a second repetition eliminating unit configured to perform repetition elimination on the popular broadcast information included in the M middle hot content datum by means of a preset similarity rate repetition eliminating device; and
  a third repetition eliminating unit configured to perform repetition elimination on the search terms and the popular broadcast information included in the M middle hot content datum by means of a preset similarity rate repetition eliminating device.

14. The apparatus according to claim 9, wherein the repetition eliminating module comprises:
  a first repetition eliminating unit configured to perform repetition elimination on the search terms included in the M middle hot content datum by means of a preset similarity rate repetition eliminating device and a preset similarity fingerprint repetition eliminating device;
  a second repetition eliminating unit configured to perform repetition elimination on the popular broadcast information included in the M middle hot content datum by means of a preset similarity rate repetition eliminating device; and
  a third repetition eliminating unit configured to perform repetition elimination on the search terms and the popular broadcast information included in the M middle hot content datum by means of a preset similarity rate repetition eliminating device.

15. The apparatus according to claim 8, wherein the repetition eliminating module comprises:
  a first repetition eliminating unit configured to perform repetition elimination on the search terms included in the M middle hot content datum by means of a preset similarity rate repetition eliminating device and a preset similarity fingerprint repetition eliminating device;
  a second repetition eliminating unit configured to perform repetition elimination on the popular broadcast information included in the M middle hot content datum by means of a preset similarity rate repetition eliminating device; and
  a third repetition eliminating unit configured to perform repetition elimination on the search terms and the popular broadcast information included in the M middle hot content datum by means of a preset similarity rate repetition eliminating device.

16. A non-transitory computer readable storage medium including a set of instructions that, when executed, cause at least one processor to perform the following steps:
  acquiring N search requests and N search responses corresponding to the N search requests, wherein N is a natural number;
  analyzing each of the N search request and each of the N search responses corresponding to the each of the N search requests to obtain N initial hot content datum, wherein the initial hot content datum include search terms, popular broadcast information and/or data trend information;
  calculating a weight of each initial hot content data, and select M middle hot content datum from the N initial hot content datum according to the weight of each initial hot content, wherein M is a natural number and is no more than N;
  performing repetition elimination on the M middle hot content datum; and
  selecting hot content from the M middle hot content datum after the repetition elimination.

17. The method according to claim 2, wherein the step of performing repetition elimination on the M middle hot content datum comprises:
  performing repetition elimination on the search terms included in the M middle hot content datum by means of a preset similarity rate repetition eliminating method and a preset similarity fingerprint repetition eliminating method; or
  performing repetition elimination on the popular broadcast information included in the M middle hot content datum by means of the preset similarity rate repetition eliminating method; or
  performing repetition elimination on the search terms and the popular broadcast information included in the M middle hot content datum by means of the preset similarity rate repetition eliminating method.

* * * * *